United States Patent [19]

Shimizu et al.

[11] Patent Number: 5,228,932
[45] Date of Patent: Jul. 20, 1993

[54] FE-CR-AL ALLOY, CATALYTIC SUBSTRATE COMPRISING THE SAME AND METHOD OF PREPARATION

[75] Inventors: Hiroshi Shimizu; Sadao Hasuno, both of Chiba, Japan

[73] Assignee: Kawasaki Steel Corporation, Japan

[21] Appl. No.: 889,656

[22] Filed: May 27, 1992

[30] Foreign Application Priority Data

May 29, 1991 [JP] Japan .................. 3-124361
May 29, 1991 [JP] Japan .................. 3-124363
Oct. 31, 1991 [JP] Japan .................. 3-286071

[51] Int. Cl.$^5$ .......................... C22C 38/28; C21D 8/00
[52] U.S. Cl. ..................... 148/603; 148/597; 148/325; 428/606; 420/40; 420/62
[58] Field of Search .............. 420/40, 62; 428/606; 148/603, 597, 325

[56] References Cited

U.S. PATENT DOCUMENTS 4,784,984 11/1988 Yamanaka et al. ............. 420/40
4,904,540 2/1990 Ishii ........................... 420/40

FOREIGN PATENT DOCUMENTS 2083499 3/1982 United Kingdom .............. 420/40

*Primary Examiner*—Deborah Yee
*Attorney, Agent, or Firm*—Austin R. Miller

[57] ABSTRACT

An Fe-Cr-Al alloy having excellent oxidation resistance and high temperature brittleness resistance comprises:
Cr: 10 to 28 wt. %,
Al: 1 to 10 wt. %, and
B: 0.0003 to 0.010 wt. %,
and
La: 0.01 to 0.20 wt. % and
Zr: 0.01 to 1.0 wt. %,
while within the scope of Equation (1)

$$0.1 \leq [\text{wt. \% of Zr}]/[\text{wt. \% of La}] \leq 20 \tag{1}$$

and wherein elements of impurities are limited as follows:
C: 0.05 wt. % or less,
N: 0.02 wt. % or less,
Si: 0.5 wt. % or less,
Mn: 1.0 wt. % or less
Ti: less than 0.05 wt. %
and the balance consisting of Fe and incidental impurities.

12 Claims, 2 Drawing Sheets

FE-CR-AL ALLOY, CATALYTIC SUBSTRATE COMPRISING THE SAME AND METHOD OF PREPARATION

BACKGROUND OF THE INVENTION

1. Field of the Invention

The present invention relates to oxidation resisting alloy steel for use typically as a catalytic substrate in an exhaust gas purifying catalytic converter, and more particularly, to an Fe-Cr-Al alloy having excellent resistance at high temperatures and useful as a catalytic substrate for such a catalytic converter.

2. Related Art

Exhaust gas purifying catalytic converters are used in the automotive and other fields to convert harmful gases such as NOx, HC and CO generated at the time of mixing and burning fuel and air to harmless products. Since the catalytic reactions tend to be exothermic, the temperature of the converter increases with use. Furthermore, recently, in many cases the converter has been located adjacent to a combustion-supporting atmosphere and the catalytic reaction has taken place in the high temperature exhaust gas. Since the converter is exposed to a high temperature atmosphere and rapid heating and cooling are repeated, the converter is subjected to excessive thermal shocks.

For use under very severe conditions, a metallic material is used such as an Fe-Cr-Al alloy having excellent oxidation resistance. Ceramics cannot normally be used due to insufficient thermal shock resistance.

Furthermore, some metallic substrates can be more easily fabricated into thin foil and fine honeycomb configurations to provide greater surface area and lighter weight as compared to ceramics.

Fe-Cr-Al alloys have been disclosed in Japanese Patent Laid-Open Nos. 48-41918 and 58-177437, Japanese Patent Publication Nos. 2-58340 and 62-14626, and Japanese Patent Laid-Open Nos. 64-30653, 1-115455 and 2-303605.

However, the materials disclosed give rise to many problems, including the following:

The material disclosed in Japanese Patent Laid-Open No. 48-41918 contains both La and Zr and has B added thereto. Furthermore, Ti must be added in order to prevent the grain size from becoming coarse. According to the present invention, B has an excellent effect on improving high temperature brittleness resistance and accordingly must be present in a proper quantity as a material for a metal honeycomb for a catalytic converter, which must also have good breakage resistance. However, since Ti has a strong effect in annulling the high temperature brittleness resistance of B even if the quantity of Ti is limited, a honeycomb foil containing Ti is brittle at high temperature. Therefore, if Ti is employed to make a metal honeycomb for a catalytic converter to be located adjacent to a hot engine, the honeycomb is vulnerable to breakage due to severe thermal shock. Accordingly, the fact that Ti is present in the material disclosed in Japanese Patent Laid-Open No. 48-41918 causes a critical defect.

The materials respectively disclosed in Japanese Patent Laid Open No. 58-177437 and Japanese Patent Publication No. 2-58340 contain La and Zr in the composition. However, the content of La is disclosed as 0.05 wt. % or less. Sufficient oxidation resistance cannot be obtained, and high temperature brittleness suffers also because B is not present.

Also, since the materials disclosed in Japanese Patent Publication No. 62-14626 and Japanese Patent Laid-Open Nos. 64-30653, 1-115455 and 2-303605 do not contain B, high temperature brittleness occurs.

Therefore, if any one of the aforesaid materials is formed into foil having a thickness of 0.2 mm or less so as to be employed for making a honeycomb for a catalytic converter, satisfactory oxidation resistance cannot be obtained, causing breakaway oxidation to take place in a short time. What is even worse, the foil for making the honeycomb is susceptible to high temperature brittleness, causing breakage of the metal honeycomb.

Typically, a 0.2 mm or less thick foil is described because it meets the commercial need for a thin foil serving as a catalytic substrate for treating an exhaust gas from an automobile engine in order to reduce the exhaust gas resistance.

As described above, conventional Fe-Cr-Al alloys have insufficient oxidation resistance and unsatisfactory durability against breakage of the honeycomb when it is employed as a material for a catalytic converter which is used at high temperature, and is formed into an alloy foil having a thickness of 0.2 mm or less. This results in breakaway oxidation in which the overall material is undesirably converted into an oxidation product or the honeycomb foil exhibits brittleness at high temperatures and is easily broken.

OBJECTS OF THE INVENTION

Accordingly, an object of the present invention is to provide an Fe-Cr-Al alloy having excellent oxidation resistance and high temperature brittleness resistance.

More particularly, a further object of the present invention is to provide an Fe-Cr-Al alloy as a catalytic substrate for an exhaust gas purifying catalytic converter which uses a thin Fe-Cr-Al alloy foil having a thickness of 0.2 mm or less which is resistant to breakaway oxidation and high temperature brittleness even after long-time use in a material containing Al in a quantity less than 4 wt. %, and even if it is repeatedly heated up to 900° C., or is present in a material containing Al in a quantity of 4 wt. % or more and is repeatedly heated up to 1100° C.

DESCRIPTION OF THE PREFERRED EMBODIMENTS

We have examined the influences of elements effecting the oxidation resistance of Fe-Cr-Al alloy foils in the open air, at a high temperature, such as 1200° C. As a result it has been found that provision of both La and Zr has the surprising effect of improving oxidation resistance of the foil, which effect has not heretofore been realized or accomplished by conventional compositions in which a rare earth element such as a lanthanoid, Y or Hf is solely present.

Figure 1:
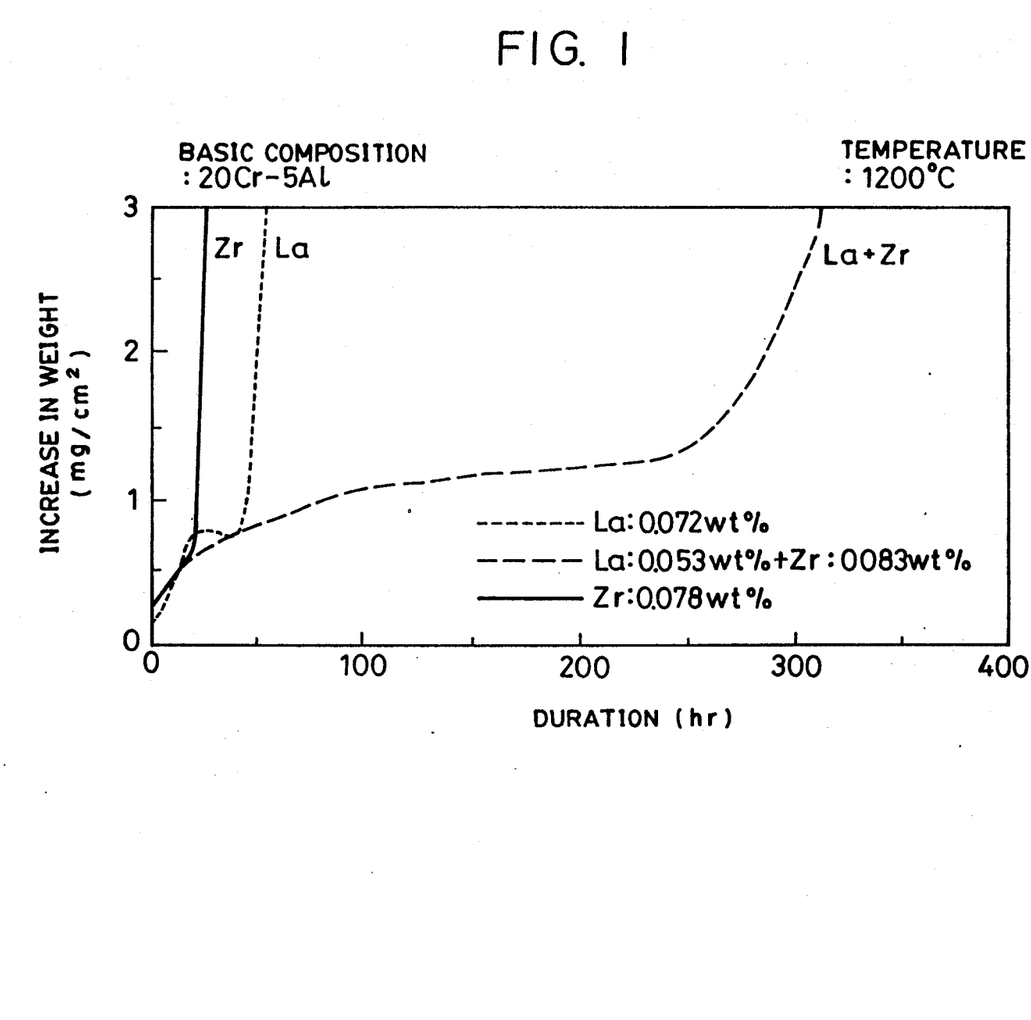
FIG. 1 is a graph showing performance characteristics of various compositions, including those inside and outside the scope of this invention, showing changes of weight with respect to duration in the open air at 1200° C. while oxidizing alloy samples composed of 0.005 wt. % C, 20 wt. % Cr, 5 wt. % Al, 0.2 wt. % Si, 0.2 wt. % Mn and the residue consisting of Fe, La, Zr and incidental impurities and respectively containing solely La (outside the inventive scope)(short dash line), solely Zr (solid line also outside the inventive scope) and both La and Zr (long dash lines and within the inventive scope)

The remarkable coaction of both La and Zr in a common foil is graphically depicted in FIG. 1 which shows change of weight of foils of alloys after being exposed to oxidation. Each of the foils had a thickness of 50 $\mu$m. The alloys were composed of 0.005 wt. % C, 20 wt. % Cr, 5 wt. % Al, 0.1 wt. % Si, 0.2 wt. % Mn and the balance consisting of Fe and incidental impurities, (a) in short dash lines the weight of the same alloy which also solely contains La in an amount of 0.072 wt. %, (b) in solid lines such an alloy which also contains Zr in an amount of 0.078 wt. %, and (c) in long dash lines an alloy which also contains both La and Zr in amounts of 0.053 wt. % and 0.083 wt. % respectively.

As is shown in FIG. 1, the alloy which solely contains La (short dash lines) and that which solely contains Zr (solid lines) show a large weight increase in a short time (less than 50 hours) due to the breakaway oxidation, while the alloy which contains both La and Zr (long dash lines) has a life much longer than the sum of the lives of the individual Zr or La alloys which solely contain the element alone.

Improvement of oxidation resistance when significant quantities of both La and Zr are present is novel and radically superior to the conventional use of La or Zr solely and separately present.

We have thoroughly examined compositions in which La and Zr are present as a composite and have found as a fact that the ratio of the contents of La and Zr must be within a predetermined range in order satisfactorily to obtain a good corrosion effect.

We have also determined that, if the content of either of La or Zr is too small as compared with the residual element, the oxidation resistance of the foil critically deteriorates. It has also been found that the ratio of the content of La and Zr must be within predetermined ranges.

Figure 2:
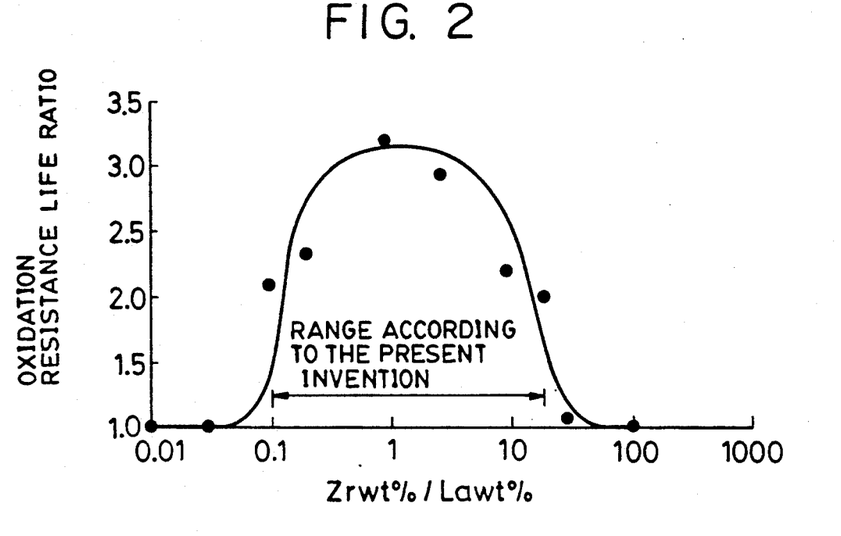
FIG. 2 is a graph showing the relationship between the oxidation resistance life ratio and the ratio of Zr to La, namely the ratio of [wt. % of Zr]/[wt. % of La] of a foil composed of 0.005 wt. % C, 20 wt. % Cr, 5 wt. % Al, 0.2 wt. % Si, 0.2 wt. % Mn and the residue consisting of Fe and incidental impurities and having a thickness of 50 μm in a range where La is 0.01 to 0.2 wt. % and Zr is 0.01 to 1.0 wt. %.

We have examined the influence of the ratio (content of Zr/content of La) on the oxidation resistance ratio of life (to be defined in Examples to be described later) of a 50 $\mu$m-thick foil made of an alloy composed of 0.005 wt. % C, 20 wt. % Cr, 5 wt. % Al, 0.1 wt. % Si, 0.2 wt. % Mn and a balance consisting of Fe and incidental impurities lies in an optimum range where the percentage La is 0.01 to 0.2 wt. % and the percentage Zr is 0.01 to 1.0 wt. %. Within these combined ranges, excellent oxidation resistance can be obtained if the content of La and the content of Zr also hold a relationship approximated by equation (1):

$$0.1 \leq [\text{weight \% of Zr}]/[\text{weight \% of La}] \leq 20 \quad (1)$$

This is graphically illustrated in FIG. 2 of the drawings.

According to the present invention, Equation (1) is essential to improve oxidation resistance. That is, it is a critical relationship for improving the oxidation resistance of an Fe-Cr-Al alloy containing La and Zr at high temperature.

Further, if the content of either of La or Zr is too small even though Equation (1) may be met, a satisfactory effect still cannot be exhibited. It has been found that each of La and Zr must be present in an amount of 0.01 wt. % or more.

If La and Zr are respectively present in amounts of 0.01 wt. % while also satisfying Equation (1), the novel effect of the invention is well achieved.

However, if La is present in an amount of 0.20 wt. % or more, metallic La is deposited in the grain boundary because La has a small solid solution limit, causing problems to arise in that an oxidation resistance corresponding to the content cannot be obtained and that the hot and cold workability of the foil deteriorate excessively. Accordingly, the upper limit of the La content must be limited to 0.20 wt. %.

If Zr is present in an excessively large quantity, an intermetallic compound such as Fe2Zr or Fe3Zr is formed, causing the oxidation resistance and hot and cold workability of the foil to deteriorate. Therefore, the upper limit of the Zr content must be limited to 1.0 wt. %.

We have also closely examined the high temperature brittleness resistance of Fe-Cr-Al alloys. As a result, it was found that addition of B to the Fe-Cr-Al alloy is particularly effective.

We have performed cyclic oxidation experiment in the atmosphere using a 50 $\mu$m-thick foil formed into a honeycomb-like shape and made of alloys each containing 0.005 wt. % C, 20 wt. % Cr, 5 wt. % Al, 0.1 wt. % La, 0.1 wt. % Zr, 0.25 wt. % Si, 0.4 wt. % Mn, and the residue composed of Fe and incidental impurities, and containing different quantities of B.

The high temperature brittleness resistance was evaluated as follows: the number of cycles which caused breakage in a cycle oxidation experiment was obtained for each sample so as to obtain a ratio with respect to the number of the cycles to which the alloy which does not contain B was subjected, the ratio being defined to be the "high temperature brittleness resistance ratio". Then, the aforesaid values were subjected to comparisons.

Figure 3:
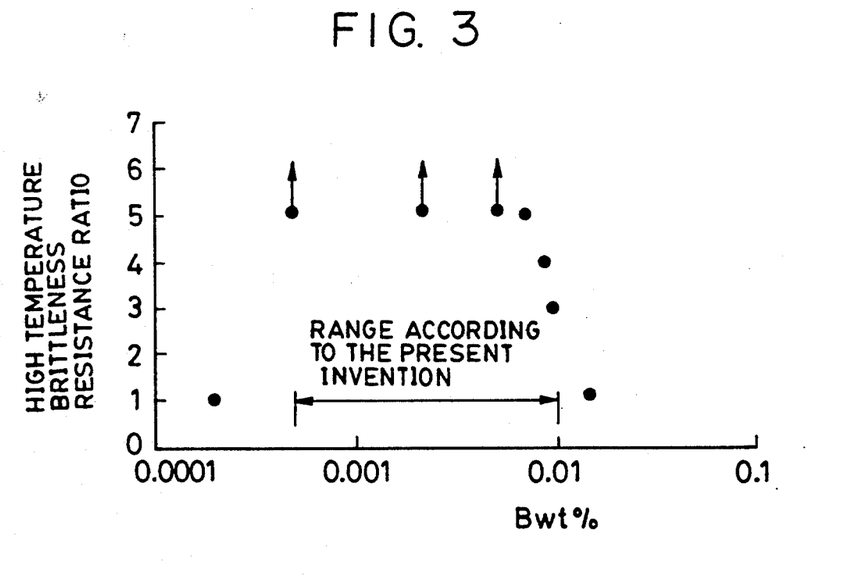
FIG. 3 is a graph showing the influence of the quantity of contained B acting on the high temperature brittleness resistance of the foil when B is present in an alloy composed of 0.005 wt. % C, 20 wt. % Cr, 5 wt. % Al, 0.1 wt. % La, 0.1 wt. % Zr, 0.25 wt. % Si, 0.4 wt. % Mn and the residue consisting of Fe and impurities.

FIG. 3 is a graph which illustrates the relationship between the high temperature brittleness resistance ratio and the content of B after the above-mentioned experiments have been carried out. As can be understood from FIG. 3, the breakage of the honeycomb can be well prevented in the case where B is present in an amount of 0.0003 to 0.01 wt. %.

The mechanism realizing the aforesaid effect may not be fully understood, but it can be considered as follows:

In a case where B is present in an adequate quantity, it can be considered that B which has become segregated in a grain boundary reduces the energy of the grain boundary, so that the deposition of a compound, the deposition site of which is the grain boundary, is prevented and therefore brittleness is combated or prevented. If B is present in an excess quantity, it can be considered that the strength of the grain boundary deteriorates by the effect of B for reducing the energy of the grain boundary and therefore brittleness takes place.

As described, it is necessary to contain B in order to prevent brittleness of metal honeycomb taken place at high temperature.

We have carefully examined the effect of improving the high temperature brittleness resistance of B, resulting in a discovery that the presence of Ti annuls the effect of B for improving high temperature brittleness resistance under experimental conditions in which a very severe thermal shock is applied. That is, when a metal honeycomb made of 50 μm thick foil comprising an alloy containing Ti by 0.05 or more wt. % with respect to the alloy component was subjected to a thermal shock experiment to be described later, the high temperature brittleness resistance ratio of the samples of the alloys became 1.0 without exception. That is, the effect of B for improving high temperature brittleness resistance is annulled if Ti is present in an amount of 0.05 wt. % or more. The reason for this may not be fully understood, but it can be considered that TiC or the like is deposited prior to the grain boundary and that the effect of reducing the energy of the grain boundary is annulled. Accordingly, in order to cause B to exhibit the effect of improving the high temperature brittleness resistance, it is necessary to limit the content of Ti to less than 0.05 wt. %, preferably 0.03 wt. % or less.

The alloy according to the present invention is subjected to the following steps: where the Al content of the alloy is 6 wt. % or less, the alloy is melted, using an ordinary converter method, and the component adjustment is performed. The alloy is cast as a steel ingot or slab and annealing is performed after hot rolling at a temperature from 500° to 1300° C. with a reduction of 50% or more, and cold rolling and annealing are repeated in a manner to produce a coil or cut sheet having the desired thickness.

In the case of the content of Al is greater than 6 wt. %, if a coil or a cut sheet is manufactured by the above-mentioned method, the mass-production yield is unsatisfactory because the toughness of the alloy at low temperatures is too low. In this case, an alternative manufacturing method is employed which comprises following the foregoing procedure with an Al content of 6% by weight or less adhering Al or an Al alloy containing required elements to the surface of the coil or the cut sheet by sputtering, plating, cladding, etc.; diffusing the elements by a homogenizing heat treatment to produce a coil or a cut sheet having the desired chemical composition, and performing cold rolling and annealing.

Either such manufacturing method mentioned above can be used after the rolling process without annealing has been performed. When a final product which has been annealed is manufactured, BA (Bright Annealing) is performed in an atmosphere of an inactive gas containing oxygen at a low partial pressure or an atmosphere of a reducing gas. The reason for this lies in that, if annealing is performed in the open air, Al contained in the alloy is oxidized to form $Al_2O_3$ scale which consumes the Al in the alloy, causing problems in machining the honeycomb.

The reason why hot rolling is performed at a temperature ranging from 500° to 1300° C. with a reduction of 50% or more in the above-mentioned manufacturing method lies in that, if the conditions deviate from the above-mentioned range, general performance required to create the Fe-Cr-Al alloy plate cannot be obtained.

In either of the manufacturing methods just discussed, it is preferable that the reduction at the time of cold rolling is 30% or more, and that annealing after cold rolling is performed at a temperature from 1200° to 800° C. High temperature brittleness resistance can be further improved in that way.

In the alternative manufacturing method using surface-adhered Al or Al alloy, the aforesaid manufacturing conditions are applied to the cold rolling process and the annealing process to be performed after diffusing the Al alloy or the Al alloy containing required elements.

By making the reduction 30% or more in the cold rolling process, sufficient distortion can be accumulated in the material. By performing annealing at 800° C. or higher, the amount of B that is present can be uniformly dispersed. Since the presence of B improves the high temperature brittleness resistance of the sheet, because it reduces the energy of the grain boundary, it is preferable that the B content is well segregated in the grain boundary. In order to achieve this, manufacturing is preferably performed by the cold rolling and annealing as described and will cause the beneficial effect of B to be exhibited.

The above-mentioned effect cannot be easily realized in a case where hot rolling and annealing are combined with each other. The annealed structure formed by hot rolling has excessively integrated textures; therefore, a uniform structure cannot be formed easily. In the case of the alloy steel of the type described above, the size of the crystallized grains upon re-crystallization by annealing after cold rolling is not determined by the holding time but it is more responsive to the holding temperature. When annealing is performed at a high temperature higher than 1200° C., the crystal grains tend to be coarsened to sizes of about 300 μm or more. Since the coarsened crystal grains have small grain boundary areas, high temperature brittleness tends to occur. Even if cold rolling is performed, the re-crystallized structure is influenced adversely and therefore a uniform structure cannot be formed easily. Since the degree of the grain boundary segregation of B becomes different in the portion in which the crystal grain size is not uniform, a portion which cannot withstand high temperature brittleness will be generated. Therefore, the annealing temperature must be 1200° C. or lower.

The aforesaid manufacturing conditions will enable a similar effect to be obtained if the material manufactured by cold rolling at a reduction of 30% or more as final rolling without annealing is formed into the honeycomb shape and as well as in a case where a heat treatment is performed at 800° to 1200° C. for one second in a brazing process to be performing after the aforesaid process.

If the thickness of the above-mentioned alloy is 0.2 mm or less, excellent oxidation resistance and high temperature brittleness resistance can be obtained as compared with conventional materials. Therefore, this is an optimum material for making a honeycomb for an exhaust gas catalytic converter.

In order to clarify the influence of the manufacturing condition of alloys (A), (B) and (C) shown in Table 1 and according to the present invention on the high temperature brittleness resistance, foil was manufactured under the following four kinds of manufacturing conditions I to IV: Manufacturing Conditions (I) The alloy was subjected to vacuum melting, hot-rolling at a temperature ranging from 900° C. to 1200° C. at a total reduction of 80%, annealing at 950° C., cold-rolling at a reduction of 88% and annealed at 950° C. for one minute. Then, cold rolling and annealing at 950° C. were repeated so that a BA material having a thickness of 50 μm was manufactured. This method is a method according to the present invention. (II) The alloy was manufactured by vacuum melting, hot-rolled at a temperature from 900° C. to 1200° C. at a total reduction of 80%, annealed at 950° C., ground and electrolytic-polished to a thickness of 65 μm, cold-rolled at a reduction of 23% and bright-annealed at 950° C. for one minute so that a BA material having a thickness of 50 μm was manufactured. The reduction was smaller than that according to the scope of the present invention.

(III) The alloy was subjected to vacuum melting, hot-rolled at a temperature from 900° C. to 1200° C. at a total reduction of 80%, annealed at 950° C., cold-rolled at a reduction of 88% and annealed at 750° C. for one minute. Then, cold rolling and annealing at 750° C. were repeated so that a BA material having a thickness of 50 μm was manufactured. The annealing temperature was lower than that according to the present invention.

(IV) The alloy was subjected to vacuum melting, hot-rolled at a temperature from 900° C. to 1200° C. at a total reduction of 80%, annealed at 950° C., cold-rolled at a reduction of 88% and annealed at 1250° C. for one minute. Then, cold rolling and annealing at 1250° C. were repeated so that a BA material having a thickness of 50 μm was manufactured. The annealing temperature was higher than that according to the claim of the present invention.

Table 2 shows the results and indicates the influence of the manufacturing conditions on the resistance of the honeycomb to breakage (evaluated according to criteria to be defined later) and the high temperature brittleness resistance (evaluated according to the criteria to be defined later). As shown in Table 2, Example I according to the present invention with annealing at a temperature from 1200° to 800° C. after cold rolling at a reduction of 30% or more has been performed has a high temperature brittleness resistance ratio of 5 or more. However, Examples II, III and IV which do not meet the above-mentioned conditions have a lesser high temperature brittleness ratio of 4.5 or less.

Therefore, it will be understood that the method according to the present invention significantly improves the high temperature brittleness resistance of the alloy due to the presence of B.

TABLE 1

| Alloy No. | C | Si | Mn | Cr | Al | N | Zr | La | B | Zr/La |
|---|---|---|---|---|---|---|---|---|---|---|
| A | 0.005 | 0.10 | 0.20 | 20.2 | 5.08 | 0.0055 | 0.083 | 0.053 | 0.0021 | 1.57 |
| B | 0.002 | 0.20 | 0.18 | 25.0 | 1.5 | 0.0017 | 0.40 | 0.19 | 0.0014 | 2.11 |
| C | 0.008 | 0.12 | 0.10 | 18.5 | 3.1 | 0.0070 | 0.080 | 0.030 | 0.0077 | 2.67 |

TABLE 2

| Manufacturing No. (Example No.) | Alloy (shown in Table 1) | Cyclic Oxidation Test Breakage of honeycomb*1 | Cyclic Oxidation Test High Temperature Brittleness resistance ratio | Thermal Shock Test Breakage of honeycomb*1 | Thermal Shock Test High Temperature brittleness resistance ratio |
|---|---|---|---|---|---|
| I | A | 0 | >5 | 0 | >5 |
|   | B | 0 | >5 | 0 | >5 |
|   | C | 0 | >5 | 0 | >5 |
| II | A | 0 | 4.5 | 0 | 4.0 |
|   | B | 0 | 4.0 | 0 | 4.0 |
|   | C | 0 | 4.5 | 0 | 4.0 |
| III | A | 0 | 4.5 | 0 | 4.0 |
|   | B | 0 | 4.5 | 0 | 4.3 |
|   | C | 0 | 4.5 | 0 | 4.3 |
| IV | A | 0 | 4.8 | 0 | 4.5 |
|   | B | 0 | 4.5 | 0 | 4.5 |
|   | C | 0 | 4.8 | 0 | 4.5 |

*1 0: no breakage
x: broken

The operation and effect of the other elements of the alloy, and the basis of the associated numerical limits, will now be described.

Cr: Cr improves the oxidation resistance of Al and also has the effect of improving the oxidation resistance of the alloy. In order to exhibit these effects, Cr must be present in an amount of 10 wt. % or more. The effect of Cr for improving oxidation resistance improves in proportion to the content, and excellent oxidation resistance is obtained if it is present in an amount of 18 wt. % or more. However, if the Cr content is more than 28 wt. % the toughness and ductility of the alloy deteriorate, interfering with ease of manufacturing procedures. Therefore, the Cr range is limited to 10 to 28 wt. %.

Al: Al serves to maintain oxidation resistance and is capable of withstanding high temperatures for long times, all in proportion to increases of Al content. If the temperature at which it is actually used as the catalytic converter is 900° C. or lower, the content of Al may be less than 4 wt. %. If it is used at a temperature higher than 900° C., the content must be 4 wt. % or more. In order to cause Al to exhibit a sufficient effect, the Al content must be 1 wt. % or more.

In a case where an alloy containing 6 wt. % Al or more is melted and manufactured, it is hard to be manufactured easily because of its unsatisfactory toughness. Therefore, the component of the alloy steel may be adjusted by causing Al or Al alloy to adhere to an alloy having a proper composition to be rolled, and dispersing Al or Al alloy by heat treatment. However, if the content is more than 10 wt. %, the toughness of the alloy steel deteriorates excessively and cracks tend to be generated in a foil rolling process intended to be performed after the process of dispersing the Al plating layer, even if the Al plating method is employed. Therefore, the upper limit of Al content is 10 wt. % and the range is 1 to 10 wt. %.

C and N: Both C and N have low solid solution limits in ferrite stainless steel and therefore are deposited as a carbide or nitride, which lowers corrosion resistance and excessively deteriorates toughness and ductility of the steel plate. In particular, N forms a nitride with Al and this reduces the remaining effective amount of Al (solid-dissolved Al). What is even worse, big nitrides cause defects when manufacturing the foil, causing the yield to deteriorate excessively. Therefore, it is preferable that the content of N be minimized, and the upper limit of C is 0.05 wt. % and that of N is 0.02 wt. % as a result of consideration made on the industrial and economical viewpoint of the ingot technology.

Si and Mn: Si and Mn are sometimes left in the steel when they are added as sub-deoxidizers for deoxidizing Al. Si deteriorates the spalling resistance of the oxide scale and Mn deteriorates the oxidation resistance and corrosion resistance of the steel. Therefore it is preferable that their contents are minimized, but the upper limit of Si is 0.5 wt. % and that of Mn is 1.0 wt. %.

One or more kinds of elements selected from the following element group are added to the steel having the above-mentioned elements as substantial basic components.

Ca: Ca is an element for stabilizing S in the steel to purify the steel in order to improve its oxidation resistance and the toughness. Furthermore, Ca is also an element for improving toughness by lowering the melting point of $Al_2O_3$ to accelerate floating of $Al_2O_3$ generated at the time of the refining process and by reducing the inclusions in the steel. If it is present in a quantity larger than 0.05 wt. % in the steel, the oxidation resistance deteriorates contrarily. Therefore, the upper limit is 0.05 wt. %.

Mg: Mg is an element for improving the oxidation resistance of the steel by generating very fine $Al_2O_3$ scale in a case where it is present in a small quantity. If it is present in a quantity larger than 0.05 wt. %, properties affecting manufacturing feasibility, such as hot workability, deteriorate. Therefore, the upper limit is 0.05 wt. %.

Lanthanoids, except for La, Y and Hf: (The members of the lanthanoid series are La, Ce, Pr, Nd, Pm, Sm, Eu, Gd, Tb, Dy, Ho, Er, Tm, Yb and Lu). Lanthanoids such as Nd and Sm except for La, Y and Hf have the effect of improving oxidation resistance of the steel by improving spalling resistance of an oxide film generated in the Fe-Cr-Al alloy at high temperatures. However, since their solid solution limit is small and if they are present in a quantity larger than the solid solution limit, they are deposited causing hot and cold workability to deteriorate. Therefore, the upper limit of lanthanoids except for La is 0.20 wt. %, that of Y is 0.50 wt. % and that of Hf is 0.30 wt. %. Ce, which is lanthanoid, gives unsatisfactory improvement of oxidation resistance and if it is present in a large quantity the effect of La for improving oxidation resistance deteriorates. Therefore, it is preferable that it is not present.

Nb, Ta and V: These elements tend to make N, which forms AlN and therefore consumes Al, causing oxidation resistance to deteriorate. However, if they are present in excessive amounts the solid solution quantity of the above-mentioned elements increases, causing oxidation resistance to deteriorate or causing the machining feasibility in a hot or cold state to deteriorate. Therefore, the upper limit of the total quantity of the contents of these elements is 1.0 wt. %.

EXAMPLES

Examples of the present invention will now be described while also describing comparative examples. The Examples are intended to be illustrative and not to limit or define the scope of the invention.

Table 3 shows the average chemical compositions of alloys according to the present invention and comparative alloys in the thickness direction.

Referring to Tables 3-1, 3-2, 3-3 and 3-4, the alloys bearing Sample Nos. 14 and 18 according to the present invention and comparative alloys 8 and 10 were manufactured by the following steps in which: Fe-Cr-Al alloy plates each having a proper composition was subjected to Al-plating. They were subjected to a diffusion process in an inactive gas so that alloy plates the target compositions of which were shown in Table 1 were obtained. They were cold-rolled at a reduction of 50% to a thickness of 50 μm, and bright annealing was performed at 950° C. for one minute. The alloys except for the above-mentioned four types of alloys were manufactured by vacuum dissolution and were hot rolled at a temperature from 900° to 1200° C. at a total reduction of 80%, annealed at 950° C., cold rolled at a reduction of 88%, annealed at 950° C. for 30 seconds, and cold rolling and annealing were repeated so as to make the foil thickness 50 μm and bright annealing was performed at 950° C. for one minute.

Samples thus manufactured were subjected to the following experiments.

The oxidation resistance life of each sample was evaluated to confirm the lengthening the life due to the synergetic effect obtainable by the combined addition of La and Zr, the evaluation being made in such a manner that comparative materials were manufactured so that oxidation resistance life could be measured. Then, the magnification of the life of the material containing the two elements La and Zr with respect to the sum of life was evaluated as the oxidation resistance life, namely, (The magnification of the life) = (The life of the material containing La and Zr)/[The life of the material containing sole La) + (The life of the material containing sole Zr)].

The oxidation resistance life was defined by obtaining the relationship between the oxidation time and change in the weight of the aforesaid BA foil having a thickness of 50 μm due to the oxidation performed at 1200° C. in open air and by defining the oxidation resistance life by the total oxidation time at which the change in weight becomes 2.0 mg/cm$^2$.

As for the samples containing Al in a quantity which is less than 4 wt. %, the oxidation resistance life of an alloy steel composed of 0.005 wt. % C, 18 wt. % Cr, 3 wt. % Al, 0.08 wt. % La, 0.1 wt. % Si, 0.1 wt. % Mn and the balance consisting of Fe and incidental impurities as conventional material was made the reference and the oxidation resistance life ratio was defined as an absolute oxidation resistance life ratio so as to be used as the index for the evaluation.

As for the samples containing Al in a quantity which is more than 4 wt. %, the oxidation resistance life of an alloy steel composed of 0.005 wt. % C, 20 wt. % Cr, 5 wt. % Al, 0.08 wt. % La, 0.1 wt. % Si, 0.2 wt. % Mn as conventional material and the balance consisting of Fe and incidental impurities as conventional material was made the reference and the oxidation resistance life ratio was defined as an absolute oxidation resistance life ratio so as to be used as the index for the evaluation.

The high temperature brittleness resistance was evaluated by two types of experimental methods, that is a cyclic oxidation test in the open air and a thermal shock test by using an engine bench. The cyclic oxidation test in the atmosphere was performed for the purpose of screening the material, while the thermal shock test by using the engine bench was performed for the purpose of strictly evaluating the material.

In the cyclic oxidation test in the open air, honeycombs were used each of which was manufactured by coiling a flat plate and a wave plate made of foil of each sample and having a thickness of 50 μm before they were Ni-blazed.

A sample containing Al 4 wt. % or more was heated to 1100° C., while a sample containing Al of less than 4 wt. % was repeatedly heated to 900° C. and cooled to room temperature.

In the thermal shock test using the engine bench, the honeycomb subjected to the aforesaid steps including the blazing process and a honeycomb caused to carry γ-$Al_2O_3$ and catalytic metal were used. The honeycomb was positioned to align to the manifold of the engine and the temperature of the central portion of the honeycomb was measured in such a manner that the sample containing Al of 4 wt. % or more was subjected to a short time cycle between the highest temperature of 1100° C. and the lowest temperature of 300° C. and the sample containing less than 4 wt. % Al was subjected to a temperature between the highest temperature of 900° C. and the same lowest temperature. At this time, the cooling process from the high temperature to 300° C. was adjusted so that the honeycomb was rapidly cooled in a short time.

The high temperature brittleness resistance was evaluated in such a manner that the number of cycles was made by two times the cycle times at which the conventional material generated cracks in the two types of experiments, and the fact as to whether or not there were cracks in the honeycomb foil was expressed by o or x in a dismantlement inspection performed in the experiment. In order to evaluate the improvement of high temperature brittleness resistance in a further quantitative manner, the two types of experiments were carried out several times to obtain the average number of cycles for breakage to take place. Furthermore, the ratio of the average cycles of a 18Cr-3Al alloy and that of sample containing Al by 4 wt. % or less, or the ratio of the average cycles of a 20Cr-5Al alloy and that of sample containing Al by 4 wt. % or more were used to evaluate the high temperature brittleness resistance as the high temperature brittleness resistance ratio.

Among the Comparative steel samples (Tables 3-3 and 3-4), the content of La in sample No. 5, the contents of La and Zr in sample No.6, the content of Cr in sample No. 7 and the content of Al in No. 8 were too large and deviated from the scope of the present invention. In these Comparative Examples, hot rolling could not be performed and the products could not be formed into the foil.

Among the Comparative steel samples, the content of lanthanoids except for La in sample No. 16, the content of Y in sample No. 17, the content of Hf in sample No. 18 and the total content of Ta, Nb and V in sample No. 19 were too large and deviated from the scope of the present invention. Hot rolling could not be performed and therefore the products could not be formed into the foil.

Comparative steel samples 1 to 4, 9 to 15 and 20 to 22 had unsatisfactory oxidation resistance and experienced breakaway oxidation or high temperature brittleness in the thermal shock test with the engine bench, resulting in breakage of the honeycomb.

Although Comparative steel samples 23 to 25 contained B, they had unsatisfactory high temperature brittleness resistance because they contained excessive Ti by 0.05 wt. % or more. As a result the honeycomb was broken in severe thermal shock tests performed by using the engine bench.

On the other hand, in the steel samples according to the present invention, Tables 3-1 and 3-2, the honeycomb was not broken in the severe thermal shock tests using the engine bench. The results of the oxidation resistance life ratios and the absolute oxidation life ratios were larger than 2.0. Therefore, it will be understood that the steel according to the present invention was a catalytic converter material having excellent durability.

Table 4 shows the oxidation resistance life ratio, the absolute oxidation resistance life ratio, the fact whether or not there was a breakage of the honeycomb after completing the two types of experiments for evaluating the high temperature brittleness resistance, and the high temperature brittleness resistance ratio of the Examples according to the present invention and the Comparative Examples. Furthermore, manufacturing feasibility is commented upon.

According to the present invention, the ratio of La and Zr in the Fe-Cr-Al alloy is limited. Therefore, an oxidation resistance life longer than would be expected, that is, longer than the sum of the life of an alloy solely containing La and an alloy solely containing Zr, can be realized. Furthermore, since B is present in a quantity according to this invention, a metal honeycomb for a catalytic converter which does not break, even if a severe thermal shock is applied, can be provided. Furthermore, a material having particularly excellent oxidation resistance and durability at high temperatures, higher than 900° C., can be provided.

The alloy according to the present invention is the optimum alloy as a heat resisting material well suited for use in catalytic converters for automobiles. In particular, excellent performance can be realized even if it is formed into foil having a thickness as low as 0.2 mm or less.

TABLE 3-1

| SAMPLE NO. | C | Si | Mn | Cr | Al | N | Zr | La | B | Ti | LANTHANOIDS EXCEPT FOR LA;Y;Hf | Nb, Ta, V | Ca, Mg | Zr/La |
|---|---|---|---|---|---|---|---|---|---|---|---|---|---|---|
| 1 | 0.005 | 0.10 | 0.20 | 20.2 | 5.08 | 0.0055 | 0.083 | 0.053 | 0.0021 | | | | | 1.57 |
| 2 | 0.005 | 0.25 | 0.40 | 20.6 | 5.05 | 0.0049 | 0.100 | 0.097 | 0.0025 | | | | | 1.03 |
| 3 | 0.002 | 0.20 | 0.18 | 25.0 | 1.5 | 0.0017 | 0.40 | 0.19 | 0.0014 | | | | | 2.11 |
| 4 | 0.007 | 0.25 | 0.40 | 18.3 | 3.1 | 0.0050 | 0.090 | 0.070 | 0.0020 | | | | | 1.29 |
| 5 | 0.008 | 0.12 | 0.10 | 18.5 | 3.1 | 0.0070 | 0.080 | 0.030 | 0.0077 | | | | | 2.67 |
| 6 | 0.005 | 0.15 | 0.15 | 20.2 | 5.6 | 0.0060 | 0.080 | 0.080 | 0.0015 | | | | | 1.00 |
| 7 | 0.005 | 0.08 | 0.08 | 20.2 | 5.2 | 0.0070 | 0.080 | 0.080 | 0.0011 | | | | | 1.00 |
| 8 | 0.006 | 0.15 | 0.14 | 19.9 | 5.1 | 0.0051 | 0.081 | 0.080 | 0.0005 | | | | | 1.01 |
| 9 | 0.004 | 0.10 | 0.15 | 18.0 | 3.13 | 0.0046 | 0.081 | 0.080 | 0.0009 | | | | | 1.01 |

TABLE 3-1-continued (WEIGHT %)

| SAMPLE NO. | C | Si | Mn | Cr | Al | N | Zr | La | B | Ti | LANTHANOIDS EXCEPT FOR LA;Y;Hf | Nb, Ta, V | Ca, Mg | Zr/La |
|---|---|---|---|---|---|---|---|---|---|---|---|---|---|---|
| 10 | 0.006 | 0.12 | 0.12 | 12.5 | 3.22 | 0.0052 | 0.079 | 0.082 | 0.0008 | | | | | 0.96 |
| 11 | 0.006 | 0.14 | 0.10 | 12.0 | 5.0 | 0.0048 | 0.080 | 0.082 | 0.0008 | | | | | 0.98 |
| 12 | 0.004 | 0.01 | 0.03 | 20.5 | 4.99 | 0.0070 | 0.144 | 0.106 | 0.0017 | | Hf:0.15 | | | 1.07 |
| 13 | 0.002 | 0.15 | 0.24 | 19.8 | 4.40 | 0.0052 | 0.196 | 0.050 | 0.0066 | | Sm:0.05, Y:0.15 | | | 3.93 |
| 14 | 0.005 | 0.07 | 0.10 | 20.7 | 8.6 | 0.0080 | 0.080 | 0.110 | 0.0078 | | Y:0.10 | | | 0.73 |
| 15 | 0.003 | 0.32 | 0.26 | 28.0 | 2.9 | 0.0002 | 0.684 | 0.120 | 0.0005 | 0.01 | | | | 5.70 |
| 16 | 0.008 | 0.13 | 0.20 | 25.4 | 4.1 | 0.0070 | 0.030 | 0.170 | 0.0032 | 0.02 | Y:0.25, Hf:0.07 | Ta:0.30, V:0.10 | | 0.18 |

TABLE 3-2

(WEIGHT %)

| SAMPLE NO. | C | Si | Mn | Cr | Al | N | Zr | La | B | Ti | LANTHANOIDS EXCEPT FOR LA;Y;Hf | Nb, Ta, V | Ca, Mg | Zr/La |
|---|---|---|---|---|---|---|---|---|---|---|---|---|---|---|
| 17 | 0.040 | 0.03 | 0.15 | 25.0 | 2.6 | 0.0070 | 0.020 | 0.020 | 0.0012 | | | V:0.31 | | 3.29 |
| 18 | 0.006 | 0.07 | 0.08 | 20.2 | 8.90 | 0.0090 | 0.500 | 0.200 | 0.0032 | | Y:0.50 | V:0.02 | | 2.50 |
| 19 | 0.007 | 0.25 | 0.39 | 17.6 | 4.98 | 0.0049 | 0.088 | 0.076 | 0.0021 | | | | Ca:0.0010 | 1.17 |
| 20 | 0.005 | 0.16 | 0.14 | 19.9 | 5.54 | 0.0060 | 0.086 | 0.082 | 0.0014 | | | | Ca:0.012 | 1.10 |
| 21 | 0.014 | 0.14 | 0.13 | 20.4 | 5.05 | 0.0077 | 0.161 | 0.028 | 0.0084 | | | | Ca:0.049 | 5.80 |
| 22 | 0.005 | 0.08 | 0.08 | 21.2 | 5.12 | 0.0070 | 0.080 | 0.083 | 0.0012 | | Nd:0.08, Y:0.08, Hf:0.08 | | Ca:0.0050 | 0.96 |
| 23 | 0.007 | 0.26 | 0.39 | 18.5 | 5.17 | 0.0050 | 0.092 | 0.073 | 0.0022 | | | | Mg:0.0008 | 1.26 |
| 24 | 0.005 | 0.17 | 0.14 | 20.3 | 5.63 | 0.0059 | 0.088 | 0.081 | 0.0014 | | | | Mg:0.0020 | 1.08 |
| 25 | 0.014 | 0.14 | 0.14 | 19.7 | 4.84 | 0.0073 | 0.165 | 0.028 | 0.0098 | | | | Mg:0.050 | 5.82 |
| 26 | 0.005 | 0.08 | 0.08 | 20.5 | 5.21 | 0.0073 | 0.077 | 0.082 | 0.0011 | | Nd:0.07, Y:0.15 Hf:0.11 | | Mg:0.0005 | 0.93 |
| 27 | 0.004 | 0.12 | 0.10 | 19.9 | 4.78 | 0.0055 | 0.085 | 0.113 | 0.0021 | | Nd:0.05, Y:0.03 | Ta:0.12 | Ca:0.0030, Mg:0.0055 | 0.75 |
| 28 | 0.011 | 0.10 | 0.24 | 23.5 | 2.12 | 0.0048 | 0.120 | 0.095 | 0.0011 | 0.02 | Y:0.03, Sm:0.05 | Nb:0.42 | Ca:0.011, Mg:0.0047 | 1.26 |

TABLE 3-3

(WEIGHT %)

| COMPARATIVE EXAMPLE NO. | C | Si | Mn | Cr | Al | N | Zr | La | B | Ti | LANTHANOIDS EXCEPT FOR LA; Y; Hf | Nb, Ta, V | Ca, Mg | Zr/La |
|---|---|---|---|---|---|---|---|---|---|---|---|---|---|---|
| 1 | 0.005 | 0.10 | 0.20 | 20.5 | 5.01 | 0.0054 | — | 0.072 | 0.0020 | | | | | 0 |
| 2 | 0.005 | 0.10 | 0.20 | 20.1 | 5.04 | 0.0048 | 0.078 | — | 0.0022 | | | | | |
| 3 | 0.005 | 0.25 | 0.40 | 20.2 | 5.0 | 0.0055 | 0.105 | 0.103 | — | | | | | 1.02 |
| 4 | 0.005 | 0.11 | 0.20 | 20.0 | 4.98 | 0.0052 | — | 0.0831 | — | 0.061 | | | | 0 |
| 5 | 0.006 | 0.10 | 0.11 | 19.8 | 5.0 | 0.0083 | 0.050 | 0.250 | — | | | | | 0.20 |
| 6 | 0.006 | 0.09 | 0.10 | 20.1 | 4.98 | 0.0083 | 1.50 | 0.269 | 0.0010 | | | | | 5.58 |
| 7 | 0.007 | 0.14 | 0.15 | 29.3 | 4.96 | 0.0072 | 0.171 | 0.029 | 0.0089 | | | | | 5.86 |
| 8 | 0.007 | 0.16 | 0.15 | 19.8 | 11.0 | 0.0072 | 0.054 | 0.029 | 0.0002 | | | | | 1.85 |
| 9 | 0.005 | 0.39 | 0.15 | 20.2 | 3.5 | 0.0060 | — | — | — | 0.05 | | Ta: 0.07 | | |
| 10 | 0.018 | 0.25 | 0.35 | 20.6 | 7.8 | 0.0120 | — | — | — | | Nd: 0.10, Ce: 0.05 | | | |
| 11 | 0.006 | 0.13 | 0.20 | 22.1 | 6.6 | 0.0050 | 0.080 | 0.060 | — | | Y: 0.10 | | | 1.33 |
| 12 | 0.005 | 0.39 | 0.20 | 25.4 | 6.2 | 0.0070 | — | 0.090 | — | 0.20 | Nd: 0.09 | | | 0 |
| 13 | 0.006 | 0.26 | 0.16 | 25.0 | 5.2 | 0.0050 | 0.300 | 0.020 | — | | | | | 15.0 |
| 14 | 0.007 | 0.15 | 0.20 | 20.1 | 5.2 | 0.0070 | — | 0.120 | — | | Nd: 0.05 | | | 0 |
| 15 | 0.005 | 0.38 | 0.26 | 25.4 | 6.2 | 0.0070 | 0.250 | — | — | 0.20 | Y: 0.30 | | | |

TABLE 3-4

(WEIGHT %)

| COMPAR-ATIVE EXAMPLE NO. | C | Si | Mn | Cr | Al | N | Zr | La | B | Ti | LANTHANOIDS EXCEPT FOR LA; Y; Hf | Nb, Ta, V | Ca, Mg | Zr/La |
|---|---|---|---|---|---|---|---|---|---|---|---|---|---|---|
| 16 | 0.005 | 0.15 | 0.15 | 19.9 | 5.62 | 0.0058 | 0.079 | 0.083 | 0.0015 | | Nd: 0.10, Ce: 0.10, Sm: 0.04 | | | 0.95 |
| 17 | 0.005 | 0.15 | 0.15 | 20.9 | 5.41 | 0.0058 | 0.082 | 0.080 | 0.0015 | | Y: 0.55 | | | 1.03 |
| 18 | 0.005 | 0.15 | 0.15 | 19.6 | 5.46 | 0.0058 | 0.079 | 0.083 | 0.0016 | | Hf: 0.34 | | | 0.95 |
| 19 | 0.004 | 0.18 | 0.11 | 20.2 | 5.0 | 0.0050 | 0.070 | 0.091 | — | 0.64 | | Nb: 0.35, V: 0.52, Ta: 0.50 | | 0.77 |
| 20 | 0.006 | 0.25 | 0.40 | 18.3 | 3.15 | 0.0048 | 0.090 | 0.070 | 0.015 | | | | | 1.29 |
| 21 | 0.006 | 0.25 | 0.40 | 20.0 | 5.01 | 0.0048 | 0.110 | — | — | | | | | |
| 22 | 0.005 | 0.26 | 0.40 | 20.0 | 5.03 | 0.0055 | — | 0.130 | — | | | | | 0 |
| 23 | 0.015 | 0.15 | 0.12 | 20.6 | 5.1 | 0.0070 | 0.150 | 0.030 | 0.0081 | 0.06 | Ce: 0.02, Y: 0.10 | Nb: 0.20 | | 5.00 |
| 24 | 0.006 | 0.11 | 0.22 | 20.2 | 6.30 | 0.0070 | 0.650 | 0.040 | 0.0010 | 0.30 | | Nb: 0.60 | | 16.25 |
| 25 | 0.007 | 0.25 | 0.37 | 17.2 | 5.61 | 0.0053 | 0.100 | 0.070 | 0.0021 | 0.10 | Nd: 0.05, Ce: 0.02, Sm: 0.03, Y: 0.11, Hf: 0.07 | Nb: 0.12, V: 0.09, Ta: 0.13 | Ca: 0.0008, Mg: 0.0008 | 1.44 |

TABLE 4-1

| SAMPLE NO. | OXIDATION RESISTANCE RATIO OF LIFE | ABSOLUTE OXIDATION RESISTANCE RATIO OF LIFE | CYCLIC OXIDATION TEST IN OPEN AIR | | THERMAL SHOCK TEST | | MANUFACTURE FEASIBILITY ETC. |
|---|---|---|---|---|---|---|---|
| | | | BREAK-AGE OF HONEY-COMB*1 | HIGH TEMPERATURE BRITTLENESS RESISTANCE RATIO | BREAK-AGE OF HONEY-COMB*1 | HIGH TEMPERATURE BRITTLENESS RESISTANCE RATIO | |
| 1 | 2.7 | 2.0 | ○ | >5 | ○ | >5 | |
| 2 | 3.0 | 2.8 | ○ | >5 | ○ | >5 | |
| 3 | 2.8 | 2.4 | ○ | >5 | ○ | >5 | |
| 4 | 2.7 | 2.1 | ○ | >5 | ○ | >5 | |
| 5 | 3.4 | 2.0 | ○ | >5 | ○ | >5 | |
| 6 | 3.0 | 3.2 | ○ | >5 | ○ | >5 | |
| 7 | 3.2 | 3.1 | ○ | >5 | ○ | >5 | |
| 8 | 3.1 | 3.0 | ○ | >5 | ○ | >5 | |
| 9 | 3.0 | 2.1 | ○ | >5 | ○ | >5 | |
| 10 | 2.8 | 2.3 | ○ | >5 | ○ | >5 | |
| 11 | 3.0 | 2.8 | ○ | >5 | ○ | >5 | |
| 12 | 3.2 | 3.0 | ○ | >5 | ○ | >5 | |
| 13 | 2.5 | 2.2 | ○ | >5 | ○ | >5 | |
| 14 | 3.2 | 3.9 | ○ | >5 | ○ | >5 | |
| 15 | 2.4 | 2.8 | ○ | >5 | ○ | >5 | |
| 16 | 2.6 | 2.0 | ○ | >5 | ○ | >5 | |
| 17 | 2.7 | 3.0 | ○ | >5 | ○ | >5 | |
| 18 | 2.6 | 3.8 | ○ | >5 | ○ | >5 | |
| 19 | 3.0 | 2.6 | ○ | >5 | ○ | >5 | |
| 20 | 3.1 | 3.1 | ○ | >5 | ○ | >5 | |
| 21 | 2.3 | 2.3 | ○ | >5 | ○ | >5 | |
| 22 | 3.1 | 3.2 | ○ | >5 | ○ | >5 | |
| 23 | 3.1 | 2.7 | ○ | >5 | ○ | >5 | |
| 24 | 3.2 | 3.2 | ○ | >5 | ○ | >5 | |
| 25 | 2.2 | 2.1 | ○ | >5 | ○ | >5 | |
| 26 | 3.0 | 3.1 | ○ | >5 | ○ | >5 | |
| 27 | 2.7 | 2.8 | ○ | >5 | ○ | >5 | |
| 28 | 2.4 | 2.0 | ○ | >5 | ○ | >5 | |

*1 ○: NO BREAKAGE
X: BROKEN

TABLE 4-2

| COMPARATIVE EXAMPLE NO. | OXIDATION RESISTANCE RATIO OF LIFE | ABSOLUTE OXIDATION RESISTANCE RATIO OF LIFE | CYCLIC OXIDATION TEST IN OPEN AIR | | THERMAL SHOCK TEST | | MANUFACTURE FEASIBILITY ETC. |
|---|---|---|---|---|---|---|---|
| | | | BREAKAGE OF HONEYCOMB*1 | HIGH TEMPERATURE BRITTLENESS RESISTANCE RATIO | BREAKAGE OF HONEYCOMB*1 | HIGH TEMPERATURE BRITTLENESS RESISTANCE RATIO | |
| 1 | 1.0 | 1.2 | X | 1.2 | X | 0.8 | |
| 2 | 1.0 | 0.6 | X | 0.5 | X | 0.5 | |
| 3 | 3.0 | 2.9 | X | 1.3 | X | 1.1 | |
| 4 | 0.8 | 1.0 | X | 1.0 | X | 1.0 | |
| 5 | | | | | | | HOT ROLL IMPOSSIBLE |
| 6 | | | | | | | HOT ROLL IMPOSSIBLE |
| 7 | | | | | | | COLD ROLL IMPOSSIBLE |
| 8 | | | | | | | COLD ROLL IMPOSSIBLE |
| 9 | 1.0 | 0.6 | X | 0.5 | X | 0.5 | |
| 10 | 1.0 | 1.9 | X | 1.0 | X | 1.2 | |
| 11 | 2.7 | 3.7 | X | 1.6 | X | 1.3 | |
| 12 | 1.0 | 1.8 | X | 0.5 | X | 0.3 | |
| 13 | 1.8 | 2.6 | X | 0.9 | X | 1.1 | |
| 14 | 1.0 | 1.1 | X | 1.9 | X | 1.3 | |
| 15 | 1.0 | 1.9 | X | 0.5 | X | 0.7 | |
| 16 | | | | | | | HOT ROLL IMPOSSIBLE |
| 17 | | | | | | | HOT ROLL IMPOSSIBLE |
| 18 | | | | | | | HOT ROLL IMPOSSIBLE |
| 19 | | | | | | | HOT ROLL IMPOSSIBLE |
| 20 | 2.7 | 2.1 | X | 1.1 | X | 1.0 | |
| 21 | 1.0 | 1.0 | X | 1.0 | X | 1.1 | |
| 22 | 1.0 | 1.0 | X | 1.0 | X | 1.2 | |
| 23 | 2.4 | 2.4 | O | >5 | X | 1.6 | |
| 24 | 2.3 | 2.2 | O | >5 | X | 1.1 | |
| 25 | 3.0 | 2.6 | O | >5 | X | 1.0 | |

*1 O: NO BREAKAGE
X: BROKEN

What is claimed is:

1. An Fe-Cr-Al alloy having excellent oxidation resistance and high temperature brittleness resistance, comprising:
   Cr: 10 to 28 wt. %,
   Al: 1 to 10 wt. %, and
   B : 0.0003 to 0.010 wt. %,
and:
   La: 0.01 to 0.20 wt. % and
   Zr: 0.01 to 1.0 wt. %,
while substantially within the scope of Equation (1)

$$0.1 \leq [\text{wt. \% of Zr}]/[\text{wt. \% of La}] \leq 20 \quad (1)$$

and wherein impurities are limited as follows:
   C: 0.05 wt. % or less,
   N: 0.02 wt. % or less,
   Si: 0.50 wt. % or less,
   Mn: 1.0 wt. % or less
   Ti: less than 0.05 wt. %
and the balance consisting of Fe and incidental impurities.

2. An Fe-Cr-Al alloy according to claim 1, wherein 0.05 wt. % or less of Ca and/or 0.05 wt. % or less of Mg is present.

3. An Fe-Cr-Al alloy according to claim 1 or 2 further comprising one or more elements selected from the group consisting of:
   (I) one or more elements selected from lanthanoids except for La, namely, Ce, Pr, Nd, Pm, Sm, Eu, Gd, Tb, Dy, Ho, Er, tm, Yb and Lu: A total sum of 0.20 wt. % or less
   (II) Y: 0.50 wt. % or less
   (III) Hf: 0.30 wt. % or less.

4. An Fe-Cr-Al alloy according to claim 1, 2 or 3, including one or more elements selected from the group consisting of Nb, V and Ta are contained by a total sum of 1.0 wt. % or less.

5. A catalytic substrate for an exhaust gas purifying catalytic converter comprising foil having a thickness of 0.2 mm or less and formed by rolling an alloy according to any of claims 1, 2, 3 or 4, said foil being useful as a catalytic carrier.

6. An Fe-Cr-Al alloy having excellent oxidation resistance and high temperature brittleness resistance comprising an alloy surface layer having a composition defined by any of claims 1, 2, 3 or 4, made by adhering Al or an Al alloy to the surface of an alloy and by subjecting said alloy to heat treatment to disperse Al or Al alloy.

7. A catalytic substrate for an exhaust gas purifying catalytic converter comprising a foil formed by rolling an alloy according to claim 6 and having a thickness of 0.20 mm or less, said foil being useful as a component of said catalytic substrate.

8. A method of manufacturing an Fe-Cr-Al alloy having excellent oxidation resistance and high temperature brittleness resistance comprising the steps of:
   hot-rolling an Fe-Cr-Al alloy slab composed of:
   Cr: 10 to 28 wt. %, Al: 1 to 10 wt. %, and
B: 0.0003 to 0.010 wt. %,
and:
La: 0.01 to 0.20 wt. % and
Zr: 0.01 to 1.0 wt. %,
while within the scope of Equation (1)

$$0.123 \leq [\text{wt. \% of Zr}]/[\text{wt. \% of La}] \leq 20 \quad (1)$$

and wherein elements of impurities are limited as follows:
C: 0.05 wt. % or less,
N: 0.02 wt. % or less,
Si: 0.5 wt. % or less,
Mn: 1.0 wt. % or less
Ti: less than 0.05 wt. %
and the balance consisting of Fe and incidental impurities at a temperature ranging from 500° to 1300° C. at a reduction of 50% or more;
performing annealing; and
repeating cold rolling and annealing so as to manufacture a coil or a cut sheet having a required thickness, wherein the reduction at the time of cold rolling is 30% or more and said annealing is performed in a range from 1200° C. to 800° C. after said cold rolling has been performed.

9. A method of manufacturing an Fe-Cr-Al alloy having excellent oxidation resistance and high temperature brittleness resistance according to claim 8, wherein said Fe-Cr-Al alloy slab according to claim 8 further comprises 0.05 wt. % or less of Ca and 0.05 wt. % or less of Mg.

10. A method of manufacturing an Fe-Cr-Al alloy having excellent oxidation resistance and high temperature brittleness resistance according to either claim 8 or 9, wherein said Fe-Cr-Al alloy slab further comprises one or more elements selected from the group consisting of:
 (I) one or more elements selected from lanthanoids except for La, namely, Ce, Pr, Nd, Pm, Sm, Eu, Gd, Tb, Dy, Ho, Er, Tm, Yb and Lu: A total sum of 0.20 wt. % or less
 (II) Y: 0.50 wt. % or less
 (III) Hf: 0.30 wt. % or less.

11. A method of manufacturing an Fe-Cr-Al alloy having excellent oxidation resistance and high temperature brittleness resistance according to any of claims 8, 9 or 10, wherein said Fe-Cr-Al alloy slab further comprises one or more elements selected from the group consisting of Nb, V and Ta are contained by a total sum of 1.0 wt. % or less.

12. A method of manufacturing an Fe-Cr-Al alloy having excellent oxidation resistance and high temperature brittleness resistance, the steps which include forming an alloy by adhering Al or Al alloy elements to the surface of said alloy, subjecting to heat treatment to disperse said Al or Al alloy and form a surface layer as defined by claim 1, 2, 3 or 4,
repeating cold rolling and annealing to make a coil or a cut sheet having a predetermined thickness, wherein the reduction of said cold rolling is 30% or more and said annealing is performed at a range from 1200° to 800° C.

* * * * *